United States Patent [19]
Kapiloff et al.

[11] Patent Number: 4,496,470
[45] Date of Patent: * Jan. 29, 1985

[54] CLEANING COMPOSITION

[75] Inventors: Anita G. Kapiloff, Washington, D.C.; Randolph T. Hatch, Silver Spring, Md.

[73] Assignee: The B. F. Goodrich Company, Cleveland, Ohio

[*] Notice: The portion of the term of this patent subsequent to Nov. 2, 1999 has been disclaimed.

[21] Appl. No.: 338,849

[22] Filed: Jan. 12, 1982

Related U.S. Application Data

[63] Continuation-in-part of Ser. No. 224,011, Jan. 12, 1981, Pat. No. 4,357,254.

[51] Int. Cl.³ ............................................. C02B 5/04
[52] U.S. Cl. ........................................ 252/181; 252/82; 252/87; 252/142; 134/42
[58] Field of Search .............. 252/82, 87, 181, 135, 252/136, 389 R; 134/41, 42; 148/6.15 R

[56]         References Cited
U.S. PATENT DOCUMENTS

| Re. 27,662 | 6/1973  | Hamilton        | 252/79.1 |
| 2,878,188  | 3/1959  | Callahan        | 252/136  |
| 2,934,503  | 4/1960  | Chittum et al.  | 252/87   |
| 2,994,664  | 8/1961  | Wachter         | 252/87   |
| 3,211,659  | 10/1965 | Pikaar          | 252/136  |
| 3,397,149  | 8/1968  | Gruber          | 252/82   |
| 3,909,437  | 9/1975  | Alexander et al.| 252/87   |
| 4,014,804  | 3/1977  | Anderson        | 252/136  |
| 4,100,100  | 7/1978  | Clouse et al.   | 252/389 R|
| 4,199,469  | 4/1980  | Walzer          | 252/87   |
| 4,384,900  | 5/1983  | Gotta et al.    | 252/135  |

FOREIGN PATENT DOCUMENTS 2855822  6/1979  Fed. Rep. of Germany.

OTHER PUBLICATIONS

Titanium Sulfate, The Condensed Chemical Dictionary, Gessner G. Hawley, p. 875, 8th Ed. Reinhold Comp. 450 W. 33rd St., N.Y. 10001.
Pretreatment Considerations For Reverse Osmosis, DuPont Technical Bulletin 1976.
Removal of Foulants From Permasep Permeators, DuPont Technical Bulletin 1976.

Primary Examiner—Paul Lieberman
Assistant Examiner—Hoa Van Le
Attorney, Agent, or Firm—Cantor and Lessler

[57]            ABSTRACT

A composition for cleaning fouled reverse osmosis membranes or other similar fouled surfaces. The composition will remove calcium and magnesium scale as well as iron scale and organic fouling materials. The composition is biodegradable and safe to use.

9 Claims, 3 Drawing Figures

CLEANING COMPOSITION

CROSS-REFERENCE TO RELATED APPLICATION

This application is a continuation-in-part of our copending application Ser. No. 224,011, filed Jan. 12, 1981, now U.S. Pat. No. 4,357,254, which is embodied herein in its entirety by reference.

BACKGROUND OF THE INVENTION

This invention relates to the removal of organic and mineral deposits from solid surfaces and, more particularly, in the preferred aspect, this invention relates to the removal of organic and mineral deposits in reverse osmosis systems for water purification. Specifically, this invention is concerned with a method and composition for removing scale in reverse osmosis water purification systems. In another aspect, this invention is concerned with a metal cleaner and corrosion inhibitor.

One of the most abundant natural resources on this planet earth, and paradoxically, one of the scarcest natural resources, is water. While fully 75% of the surface of the planet is water, actually very little of it is available for use by man without further treatment since most of it is saline or brackish. Furthermore, the distribution of water, especially potable water, on the planet is such that many inhabited areas are not blessed with the abundance of potable water. Thus, there is a need for purifying saline or brackish water to obtain potable water in many parts of the world.

There are other, man-made, environments wherein there is a great need for efficient and relatively inexpensive means for purifying saline or brackish water. For example, off shore drilling rigs are literally surrounded by water, none of it fit to drink, and transporting water to such locations by tanker is prohibitive in cost. One of the most efficient means devised for providing fresh water for such environments is reverse osmosis water purification systems.

The principle of reverse osmosis has been known for many years. In its simplest form, osmosis utilizes a membrane which is semi-permeable to water but which rejects certain dissolved salts. Under normal conditions, if pure water is separated from a salt solution by a semi-permeable membrane, the water will flow through the membrane from the pure water side to the impure water side, that is, from a dilute solution to a more concentrated solution, thereby diluting the more concentrated solution and continuing until osmotic equilibrium is reached. Osmotic equilibrium is reached when the osmotic head equals the osmotic pressure of the salt solution. It is well-known, however, that if a positive pressure is applied to the salt solution in an amount sufficient to overcome the osmotic pressure, the flow will be reversed and water will flow from the salt solution through the membrane to the pure water side of the membrane. Hence the term reverse osmosis.

In a reverse osmosis water purification system, impure water is pumped under high pressure into the system where it contacts the semi-permeable membrane. The product water which is 95-99% free of dissolved minerals emerges from the membrane and passes out of the apparatus. Since the output of a reverse osmosis purification system relies to a great extent on the surface area of the membrane, there have been many developments in the improvement of systems which maximize the membrane area while packaging the membrane in a minimum of space. A typical structure used in making a reverse osmosis water purification device is shown in an oversimplified form partially schematically and partially in cross-section in FIG. 1. The structure, generally designated by the numeral 10, comprises membrane 12 supported on a cellular polymer matrix 14 which, in turn, is supported on a central foraminous support 16. The foraminous support, or screen, 16 essentially acts as a spacer as well as providing some mechanical support. Spongy polymer matrix 14 is any suitable open-celled foam material which will provide some mechanical support as well as providing free passage for the water. The membrane 12 is a thin, somewhat delicate, semipermeable membrane made of any suitable material such as cellulose acetate, cellulose triacetate, a polyimide, or a polysulfone. If this structure is surrounded by saline water under pressure, at a pressure typically 41.36 to 55.14 bars, the water will pass through the membrane, travel through the polymer matrix, and then through the screen and emerge at the outlet 18 at one end of the structure. Essentially, the water follows the path designated by the arrows in FIG. 1. The membrane rejects the dissolved mineral salts. The end opposite the outlet 18 is closed.

Considering the structure shown in FIG. 1, it is clear that a structure large enough to provide a commercially usuable flow of potable water will be extremely large and impractical. Thus, this structure, for use in modern equipment, is spirally wound in jelly-roll fashion and inserted in a rigid casing to provide a replaceable cartridge for the equipment. The water enters the cartridge through an inlet and flows through the spiral windings, with water passing through the membrane throughout the cartridge and emerging through a pipe at the center of the spiral. The now concentrated saline water passes through an outlet.

It is to be distinctly understood that this invention is not at all related to the reverse osmosis water purification equipment, this brief simplified description of the typical apparatus being presented only for the purpose of understanding the system with which we are concerned and the problems which are to be solved.

Continuing with a description of the background of the invention, a typical water purification system based on reverse osmosis is shown schematically in FIG. 2. The impure water enters the pump 20 at 22. Certain chemical additives whose purpose will be described later are injected into the impure water flow at 24 and are thoroughly mixed in the impure water by a mixer 26. The water passes through filter 28 to remove solid impurities and then through booster pump 30 to a cartridge filter 32 where smaller solid impurities are removed. The water is then pumped by pressure pump 34 to the reverse osmosis apparatus 36. The water which passes through the reverse osmosis membrane in a cartridge passes out of apparatus 36 at outlet 38. Disinfectant is added at 40 and the final product passes out of the system at 42. The concentrated brine emerges from the system at 44.

The continued efficiency of a reverse osmosis system depends on the maintenance of the membrane in an unfouled condition. Probably the greatest problem experienced in the use of these systems is fouling of the membrane by scale. Typically, the membrane becomes fouled by scale build-up to a point where it must be replaced quite often, sometimes as often as several times a month. The cartridge must be removed and replaced by a clean cartridge. The used cartridge is then treated to remove scale. Obviously, it is desirable to prevent scale build-up or at least, prolong the time between cartridge changes. This is ordinarily done by injecting certain chemical additives to the impure water, these additives being used for the purpose of preventing the build-up of scale.

In the prior art, "scale" generally refers to calcium and magnesium scale.

There are a number of known additives for preventing scale build-up. Hexametaphosphate is widely used, as is sulfuric acid, in an amount sufficient to lower the pH to about 4-5. Without going into great detail in describing the mechanism of the prevention of scale build-up, it is known that hexametaphosphate prevents the growth of a precipitate of calcium magnesium oxide hydroxide. Sulfuric acid raises the solubility of calcium and magnesium salts, thereby resulting in less of a precipitate. Both of these prior art additives retard scale build-up but do not stop it altogether. It is still necessary to remove the membrane and clean it at least once a month.

Another material commonly used as a scale inhibitor is a composition of polyacrylic acid having a molecular weight of about 20,000, chlorine, and calcium hypochlorite. The chlorine and calcium hypochlorite are to inhibit microbial growth. The major disadvantage of this composition is that the chlorine damages certain membranes to the point where they must be replaced or discarded.

We have found that iron scale is often as important a problem as calcium and magnesium scale. Accordingly, as used with reference to the instant invention, that is, in the remainder of this specification and the appended claims, "scale" refers to calcium scale, magnesium scale, and/or iron scale.

Whatever prior art scale inhibitor is used, it is necessary to remove the membrane cartridge periodically for cleaning, that is, for removing the accumulated scale. Alternatively, in installations where down time can be tolerated and depending on the degree of fouling by scale or other contaminates, cleaning can be accomplished by passing a cleaning solution through the system.

There are a variety of known materials for cleaning fouled reverse osmosis membranes. By "fouled" membranes is meant membranes whose efficiency has been reduced below acceptable levels by scale, by a variety of metal oxides, by deposition of colloidal materials, and by deposition of biological materials. The known cleaning techniques unsually involve cleaning a single type of fouling. For instance, calcium carbonate precipitates can be removed by treating with hydrochloric acid at a low pH (about pH 4), sulfuric acid at about pH 4, or citric acid at about pH 4. Sulfuric acid is not particularly desirable since it adds additional sulfate ion which could cause precipitation of calcium sulfate. Calcium sulfate and calcium phosphate scale are often removed with a combination of citric acid and ammonium hydroxide at pH 8. Alternatively, this type of scale can be removed with disodium EDTA and sodium hydroxide at a pH of 7-8, or tetrasodium EDTA and hydrochloric acid at a pH of 7-8. Thus, it will be seen that while citric acid can be used to remove calcium carbonate scale and calcium sulfate scale, the needed pH conditions are quite different.

To remove organic fouling, quite often the membrane is washed with a caustic solution, that is, sodium hydroxide at no higher than pH 11. Alternatively, a commonly available enzyme activated detergent made by Proctor and Gamble, known as "Biz" is used at pH 10.

To remove colloidal fouling caused by silicates, citric acid and ammonium hydroxide at pH 4 are commonly used. Alternatively, hydrochloric acid at a pH of 2.5 can be used or sodium hydroxide at a pH of 11 can be used. Other cleaning materials for colloidal fouling are Biz at a pH of 8.5-9.5 or a pH of 11, or sodium hexametaphosphate.

The prior art has recognized that there could be fouling from metal oxides such as iron oxide. According to the prior art, iron oxide fouling is primarily caused by the use of steel piping or other fittings which gradually raise the level of ferrous iron in the water. The ferrous iron then is oxidized by dissolved oxygen to form ferric iron. The ferric oxide then deposits on the membrane. Cleaning of the ferric oxide deposits is commonly done by using citric acid and ammonium hydroxide at pH 4, citric acid and disodium EDTA and ammonium hydroxide at pH 4, or sodium hydrosulfite.

The problems and disadvantages associated with the prior art cleaning materials and methods are known to those skilled in the art, but no satisfactory solutions have been proposed. The disadvantages include the simple fact that different cleaning materials are used for different foulants, or different conditions are necessary for removing different foulants, so that a membrane must undergo several different treatments to remove all the foulants. In fact, as is recognized by those skilled in the art, none of these treatments is wholly effective against any of the foulants. In addition, certain of these treatments can be damaging to particular membranes and care must be taken, therefore, to prevent such damage. For instance, extremely low or extremely high pH will damage cellulosic membranes and the presence of chlorine will damage aromatic polyimide membranes.

Thus, a need exists for a composition capable of effectively cleaning different types of foulants from reverse osmosis membranes under a wide range of conditions.

We have also found that the composition, to be described below with reference to cleaning reverse osmosis membranes, is also useful as a metal cleaner or descaler, with the addition of a corrosion inhibitor.

BRIEF DESCRIPTION OF THE INVENTION

It is, therefore, a primary object of the present invention to provide a composition for cleaning fouled reverse osmosis membranes which is free of the aforementioned and other such disadvantages.

It is another object of the present invention to provide a composition for cleaning fouled reverse osmosis membranes which is inexpensive and easily used in the field.

It is still another object of the present invention to provide a composition for cleaning fouled reverse osmosis membranes which is effective in removing different types of fouling.

It is yet another object of the present invention to provide a composition for cleaning fouled reverse osmosis membranes which is more effective than any other known prior art composition.

It is a further object of the present invention to provide a composition for cleaning fouled reverse osmosis membranes which is effective in removing calcium scale, magnesium scale, iron scale, organic fouling, and insoluable fouling.

It is still a further object of the present invention to provide a composition for cleaning or descaling metal surfaces.

Consistent with the foregoing objects, we have found that a composition comprising certain ingredients which, individually, have little or no effectiveness, is extremely effective in removing fouling from a reverse osmosis membrane. For instance, citric acid alone removes a small portion of calcium and magnesium deposits from a membrane and is totally ineffective in removing iron scale. Similarly, EDTA will remove ½ to ⅔ of the calcium and magnesium scale but no iron scale. Phosphates and chelating agents such as malic acid, oxalic acid and sulfamic acid are not effective for cleaning these scales for other reasons.

For instance when calcium is present, oxalic acid will precipitate out. If iron is present, phosphates will precipitate out of solution. Certain of the known cleaning materials must be used at a particular pH, but maintaining the proper pH is difficult, thereby necessitating the addition of ammonium hydroxide or other otherwise extraneous materials, in the prior art.

Surprisingly, we have found that a composition comprising monobasic sodium phosphate, dibasic sodium phosphate; at least one of citric acid, malic acid, and sulfamic acid; and a nonionic detergent, is particularly effective in cleaning fouled reverse osmosis membranes. The phosphates serve a dual purpose of cleaning as well as buffering the solution of the composition to a pH of from 2 to about 4. The use of chelating agents such as malic acid, citric acid, or sulfamic acid serves the dual function of dissolving calcium and magnesium scale and preventing precipitation of phosphates caused by iron. The nonionic detergent dissolves organic materials and emulsifies other inorganic solids. An anionic detergent may be used to clean oils or oily deposits from the membrane. It is necessary to remove and emulsify solids such as colloidal materials in order to expose the scale which can then be removed by the other ingredients. By the addition of oxalic acid, we have found that all these advantages are obtained along with the removal of iron scale.

While the preferred phosphates are monobasic sodium phosphate, and dibasic sodium phosphate, the corresponding potassium or ammonium phosphates could be substituted, or even phosphoric acid, thereby lowering the lower limit of the useful pH range to about 1. Also, while the preferred composition contains both citric and malic acid, it will function with only one or with sulfamic acid in place of one or both. If the composition is to be used at high pH (up to about 12), tribasic phosphates of sodium, potassium, or ammonium could be used be instead of all or part of the monobasic and dibasic phosphates. A composition at high pH is used to clean membranes fouled with fats, oils, and other organic matter. In that case, an anionic detergent would also be used.

The composition is biodegradable which assists in disposal after cleaning.

Typical low foaming nonionic detergents are well known in the art and generally comprise the class of compounds formed by condensation of an alkyl phenol, an alkyl amine, or an aliphatic compound having a polyoxyethylene chain within the molecule, i.e., a chain composed of recurring ($-O-CH_2-CH_2-$) groups. Many compounds of this type are known and used for their detergent, surface active, wetting and emulsifying properties. The detergents of this type which are useful in the present invention are those produced by condensation of about 4-16, and preferably 4-12, moles of ethylene oxide with 1 mole of a compound selected from the group consisting of (1) an alkyl phenol having about 1-15, and preferably 7-10, carbon atoms in the alkyl group; (2) an alkyl amine having about 10-20, and preferably 12-16, carbon atoms in the alkyl group; (3) an aliphatic alcohol having about 10-20, and preferably 12-16, carbon atoms in its molecule; and (4) a hydrophobic base formed by condensing propylene oxide with propylene glycol. Mixtures of two or more of the nonionic detergent groups identified above may also be used. The number of moles of ethylene oxide which are condensed with one mole or parent compound (i.e., the alkyl phenol, the alkyl amine, or the aliphatic alcohol) depends upon the molecular weight of the hydrophobic portion of the condensation product. The nonionic detergent used in the invention should have sufficient ethylene oxide units to insure solubility thereof in the detergent composition or in any dilution thereof which may be used in practice. Furthermore, the nonionic detergent used in this invention must be low- or nonfoaming. In general, nonionic detergents suitable for use in the invention can be formed by condensing the reactants in the proportions set forth above. Determination of the foaming properties is done by well-known procedures.

BRIEF DESCRIPTION OF THE DRAWINGS

The objects and advantages discussed above, and other objects and advantages will become apparent when consideration is given to the following detailed description of the invention taken in conjunction with the drawings wherein.

DETAILED DESCRIPTION OF THE INVENTION

Figure 1:
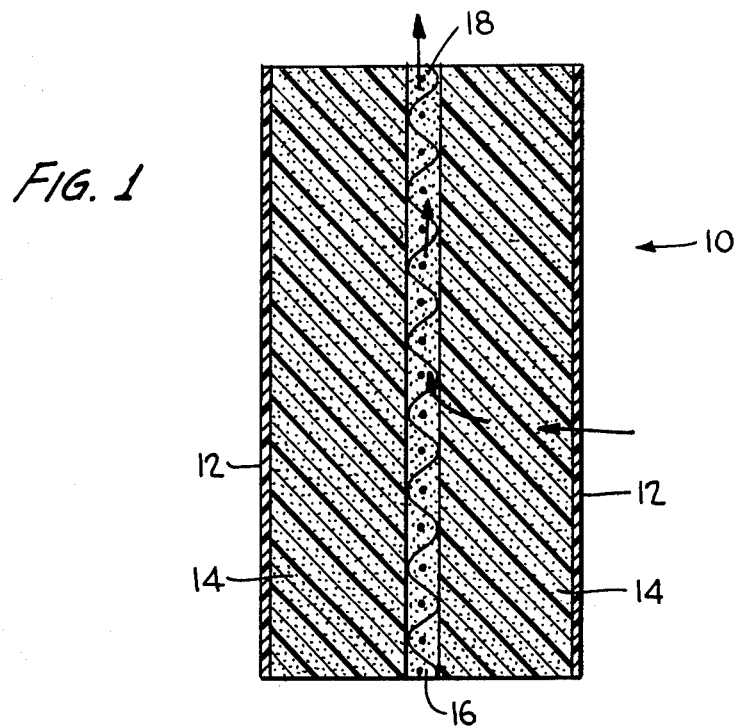
FIG. 1 is a cross-sectional view, partially schematically shown, of a typical prior art reverse osmosis membrane assembly.
Figure 2:
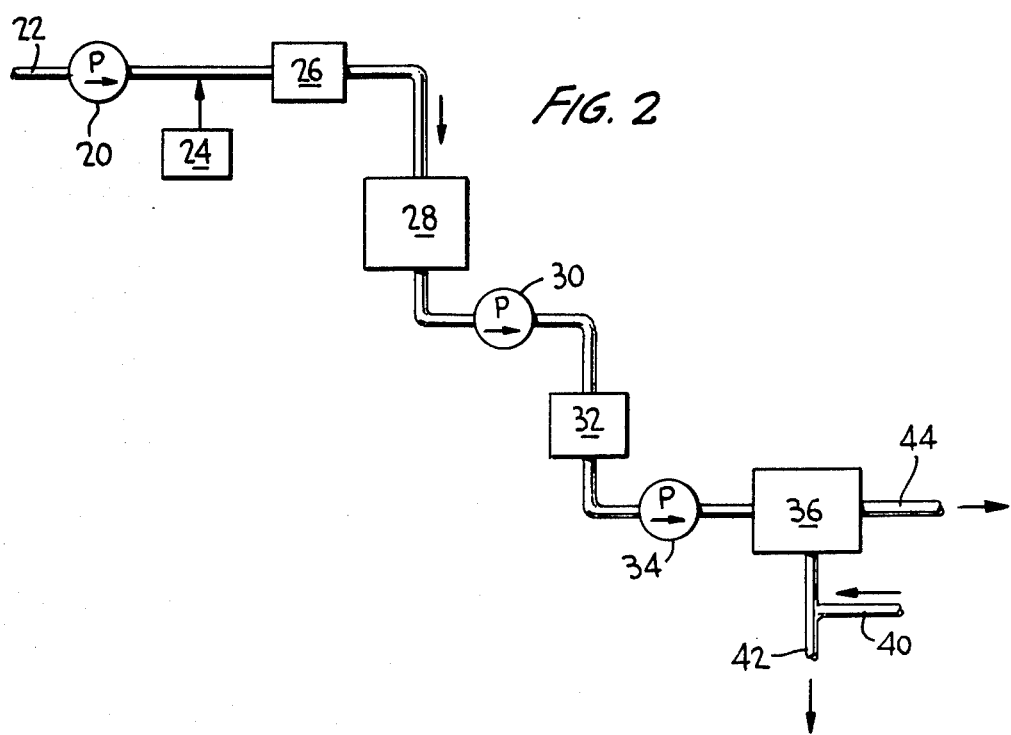
FIG. 2 is a schematic of a typical prior art reverse osmosis water purification system.
Figure 3:
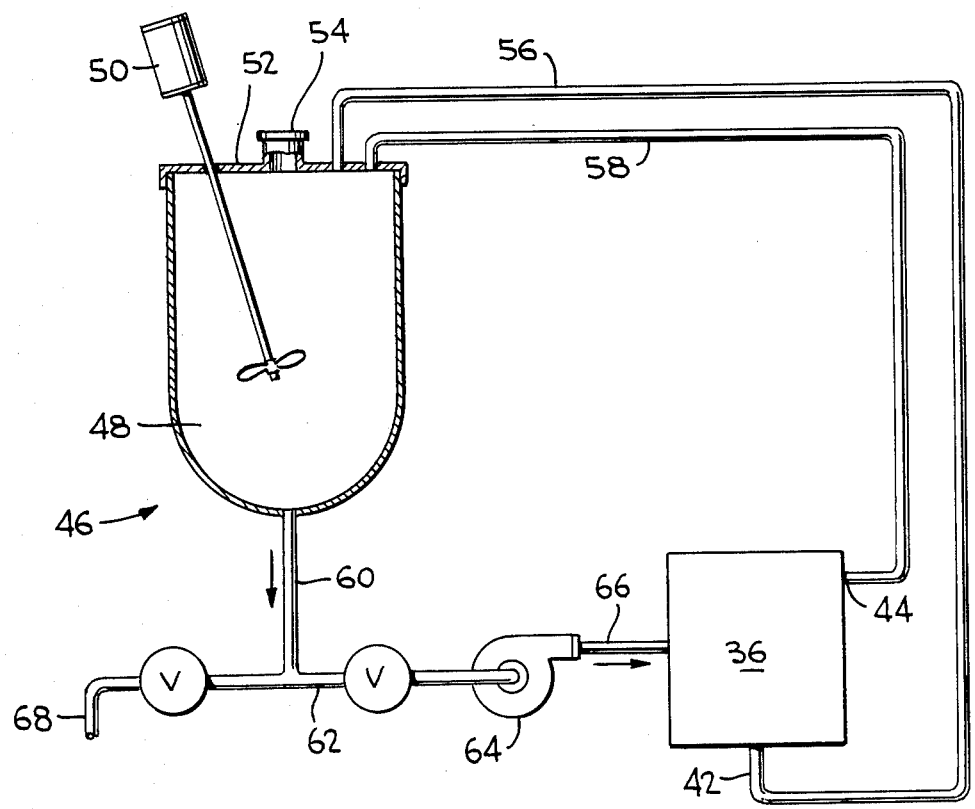
FIG. 3 is a schematic of a typical cleaning system.

A typical reverse osmosis water purification system has already been described with reference to FIG. 2. In order to have a complete understanding of the instant invention, a typical cleaning system for a reverse osmosis apparatus will now be described with reference to FIG. 3. It is to be distinctly understood that cleaning systems are well-known in the prior art and a detailed explanation of the system, therefore, is not necessary.

Typically, a cleaning system generally designated by the numeral 46 comprises a mixing tank 48 which is made of any suitable material to withstand corrosion from the environment in which it will be used. A suitable material would be any common plastic or stainless steel. Those skilled in the art realize that the size of the mixing tank is determined by the number of membranes to be cleaned at one time and the capacity of the reverse osmosis unit. A size suitable for about a three minute retention is satisfactory. Mixing tank 48 is provided with a suitable mixer 50 inserted through cover 52. Cover 52 also contains a chemical charging hatch 54 and inlet lines 56 and 58. The discharge from mixing tank 48 is through line 60 into line 62 where the cleaning solution is pumped, through pump 64 which suitably is a stainless steel centrifugal pump, to the reverse osmosis unit 36 through inlet line 66. Essentially, during the cleaning cycle, water purification is stopped and the cleaning solution is fed to the unit through the inlet line through which the infeed water would ordinarily pass. A drain 68 is provided for draining the system when cleaning is completed. The cleaning solution is fed to the reverse osmosis unit at about 10.34 bars. The permeate leaves reverse osmosis unit 36 at 42 and is recycled back to mixing tank 48 through line 56. The reject liquid leaves reverse osmosis unit 36 at 44 and is recycled back to mixing tank 48 through line 58. Thus, a closed system is established wherein the cleaning solution is passed through the reverse osmosis unit at relatively low pressure, and the permeate as well as the reject liquid are both recycled to the mixing tank.

In the case of the instant cleaning composition, the capacity of the composition to hold dissolved scale and emulsified organic and other materials is great enough that the cleaning solution can be cycled for a sufficient period of time to completely clean the membrane. In fact, the same solution could be used to clean a large number of membranes where an installation contains a number of units.

Referring now to the actual cleaning composition, it has already been mentioned that the composition, in its broadest sense, comprises monobasic sodium or potassium phosphate, dibasic sodium or potassium phosphate, citric acid, malic acid, and a nonionic detergent. This composition is primarily useful for cleaning a reverse osmosis membrane in a system wherein there is little or no iron scale. In a system wherein there is a significant amount of iron scale, oxalic acid is included. Generally, the instant composition comprises the ingredients and proportions set out in Table I.

TABLE I

| Ingredient | Percent by Weight |
| --- | --- |
| monobasic sodium phosphate | 10–40 |
| dibasic sodium phosphate | 10–40 |
| citric acid | 0–60* |
| malic acid | 0–60* |
| sulfamic acid | 0–60* |
| Renex 30 | 0.1–5** |

*at least one of citric, malic, or sulfamic acids must be present although citric acid and/or malic acid is preferred, the total amount of citric, sulfamic and/or malic acid being at least 20%.
**Renex 30 is a registered trademark of ICI Americas, Inc. and is described as polyoxyethylene (12) tridecyl ether. It is a low-foaming nonionic detergent having the following properties:

| | |
| --- | --- |
| clean to hazy colorless liquid | |
| specific gravity at 25° C./25° C. | approx. 1.0 |
| viscosity at 25° C. | approx. 60 cps |
| cloud point (1% in water) | approx. 84° C. |
| pH (1% in distilled water) | approx. 6 |
| pour point | approx. 13° C. |
| HLB number | 14.5 |

This composition is unusally effective as a fast acting formulation for cleaning fouled reverse osmosis membranes by dissolving and dispersing organic and mineral deposits which primarily comprise calcium and magnesium scale as well as silicates and colloidal clay. The composition is dissolved in water to a concentration of from about 0.1% by weight to about 5% by weight. Any concentration within that range will effectively clean the membrane, the primary effect of varying concentration being the cleaning time. At a preferred concentration of about 2%, the average system can be cleaned in from ½ to 1 hour at about 25° C. As the concentration goes to the higher end of the range, the saving in cleaning time, due to the kinetics of the system, is not appreciably shortened over the ½ to 1 hour cleaning time at the preferred concentration of 2%. As the concentration goes to the low end of the range, the cleaning time can become inconveniently long. Even at the low end of the range, however, the capacity of the solution is more than adequate to effectively clean the membrane.

Another factor to be considered in choosing the concentration is the temperature at which the cleaning solution is used. Obviously, the colder the solution, the longer the treatment time will be and vice versa. The solution can be used at any temperature at which prior art compositions are used, keeping in mind that the cleaning time at low temperatures is somewhat longer and that the high end of the range of temperatures used is governed by the material of which the membrane is made. Obviously, the cleaning solution would not be used at a temperature high enough to damage the membrane. Typical ambient temperatures are adequate. Furthermore, while a temperature rise might ordinarily be expected from passing the cleaning solution through the apparatus at high pressure, at the typical pressures used for cleaning reverse osmosis units, the temperature rise will be negligible. Yet, if that becomes a factor, heat exchange means can be provided in the mixing tank, such heat exchange means being well-known in the art.

As can be seen from Table I, either citric acid, malic acid, or sulfamic acid can be used alone, or any combination of citric acid, malic acid, and sulfamic acid can be used in in the composition. In any event, there must be at least about 20% of any one of these acids or a combination of any two or all three.

The cleaning solution is preferably used at a low pH, in the range of about 2–4, depending on the makeup of the membrane. A preferred pH range is from about 2 to 3. The exact proportions of the monobasic sodium phosphate and dibasic sodium phosphate are adjusted to provide a buffering action at the desired pH, the determination of these proportions being within the skill of the art. When it is desired to operate at a pH as low as 1, phosphoric acid is used in place of one or both sodium phosphates. When it is desired to operate at a high pH, up to 12, tribasic sodium phosphate is used in an amount of 10–40% by weight. Since these proportions are pre-determined, the complete composition, when used in the field, need only be dissolved to the desired strength without being concerned with adjustment of pH.

While this invention has been described with reference to cleaning reverse osmosis membranes, it is to be distinctly understood that it is also quite effective for cleaning the complete system, wherever deposits of scale or organic material might collect. Furthermore, it has been found, and it should be distinctly understood, that this composition is effective for cleaning any surface on which such deposits might collect, such surfaces being found in systems other than reverse osmosis systems. When used to clean a metal surface, a corrosion inhibitor specific for the particular metal may be included.

As already mentioned, in the present embodiments, potassium or ammoniumm phosphates may be used in place of the sodium phosphates indicated above. Furthermore, while a particular nonionic detergent has be used by us, any low foaming nonionic detergent can be used, such nonionic detergents being well known in the art. When it is necessary to clean oily deposits, an anionic detergent such as alkylbenzenesulfonic acid and its salts and compounds of the formula R Ar $SO_3M$, wherein R is an alkyl radical of a fatty acid, Ar is an aromatic radical such as phenyl and M is hydrogen or an alkali metal, is included. Alkali metal alkyl sulfates may also be used. Among the above-noted alkylbenzene-sulfonic acids and salts thereof, the preferred compounds include those which are biodegradable and which are particularly characterized by a linear alkyl substituent of from $C_{10}$ to $C_{22}$ and preferably from $C_{12}$ to $C_{15}$. It is, of course, understood that the carbon chain length represents, in general, an average chain length since the method for producing such products usually employs alkylating reagents of mixed chain length. It is clear, however, that substantially pure olefins as well as alkylating compounds used in other techniques can and do give alkylated benzene sulfonates wherein the alkyl moiety is substantially (i.e., at least 99%) of one chain length, i.e., $C_{12}$, $C_{13}$, $C_{14}$, or $C_{15}$. The linear alkyl benzene sulfonates are further characterized by the position of the benzene ring in the linear alkyl chain, with any of the position isomers (i.e., alpha to omega) being operable and contemplated.

In addition, to the benzene sulfonates, one may also employ the lower alkyl ($C_1$ to $C_4$) analogs of benzene such as toluene, xylene, the trimethyl benzenes, ethyl benzene, isopropyl benzene, and the like. The sulfonates are generally employed in the water-soluble salt form, which includes as the cation the alkali metals, ammonium, and lower amine and alkanolamine. The anionic detergents are well-known in the art.

The composition set forth in Table I provides the preferred range of proportions of ingredients. A more preferred composition, which has been effectively used for cleaning a reverse osmosis system used on an off shore drilling rig off the Texas Gulf Coast, where iron scale may not have been a factor, is as shown in Example 1.

EXAMPLE 1

| Ingredient | Percent by Weight |
|---|---|
| monobasic sodium phosphate | 29.0 |
| dibasic sodium phosphate | 15.2 |
| citric acid | 30.5 |
| malic acid | 24.5 |
| Renex 30 | 0.8 |

This composition, when used at a concentration of 2% by weight, provided a solution having a pH of 3 and effectively cleaned the complete system in from about ½ to about 1 hour at ambient temperature.

A particular advantage of this composition is that it is not only biodegradable, but all the ingredients are food grade so that it is unnecessary to rinse or flush the system after cleaning before restarting the system to purify water. This is extremely important in a location where potable water is ordinarily not available except through the use of the reverse osmosis system since rinsing water is essentially wasted. This is a decided advantage over other prior art compositions, another advantage being that a lesser quantity of the composition is required to remove a given amount of fouling than that of prior art compositions.

Considering that citric acid in particular is a known chelating agent, it would be expected to be effective for dissolving iron scale. We have surprisingly found, to the contrary, that citric acid is totally ineffective in dissolving iron scale. In fact, in experiments with citric acid, tetrasodium EDTA, trisodium phosphate, malic acid, and other phosphates, we have found that none of them will remove iron scale. The citric acid and malic acid, however, will chelate already dissolved iron to prevent precipitation of the phosphates caused by the iron. Yet, when there is iron scale present, these materials are ineffective in cleaning the membrane or other fouled surface.

We have found that when oxalic acid is added to the basic composition described above, the composition is surprisingly effective in removing iron scale as well as the other types of fouling without in any way having a detrimental effect on the cleaning of other fouling. Consistent, therefore, with the aforementioned objects of this invention, the composition according to this invention which is useful in cleaning surfaces wherein there is iron fouling as well as other types of fouling is set forth in Example 2.

EXAMPLE 2

| Ingredient | Percent by Weight |
|---|---|
| monobasic sodium phosphate | 10-40 |
| dibasic phosphate | 10-40 |
| citric acid | 0-60 |
| malic acid | 0-60 |
| oxalic acid | 5-30 |
| Renex 30 | 0.1-5 |

As with the composition set forth in Table I, the composition of Table III could contain either citric acid or malic acid or both as long as the citric acid and/or malic acid is present in an amount of at least 20%. Also, the proportions of the monobasic sodium or potassium phosphate and the dibasic sodium or potassium phosphate are adjusted to provide the desired pH.

The more preferred composition according to this aspect of the invention is set forth in Example 3.

EXAMPLE 3

| Ingredient | Percent by Weight |
|---|---|
| monobasic sodium phosphate | 19.9 |
| dibasic sodium phosphate | 21.0 |
| citric acid | 26.5 |
| malic acid | 21.3 |
| oxalic acid | 11.7 |
| Renex 30 | 0.7 |

The composition of Table IV was used to clean a reverse osmosis unit on an off shore drilling rig off the Texas Gulf Coast wherein fouling included iron scale. At a 2% concentration, the pH was 3 and cleaning was completed in between ½ and 1 hour.

Other formulations for use under different conditions are set forth below.

EXAMPLE 4

| Ingredient | pH 4 Percent by Weight |
|---|---|
| citric acid | 30.6 |
| malic acid | 24.6 |
| low-foaming non-ionic or anionic detergent | 0.4 |
| monobasic sodium phosphate | 39.1 |

-continued

| pH 4 | |
|---|---|
| Ingredient | Percent by Weight |
| dibasic sodium phosphate | 5.3 |

EXAMPLE 5

| pH 1.8 | |
|---|---|
| Ingredient | Percent by Weight |
| citric acid | 15.8 |
| malic acid | 12.7 |
| low-foaming non-ionic or anionic detergent | 0.2 |
| phosphoric acid | 71.3 |

EXAMPLE 6

| pH 10 | |
|---|---|
| Ingredient | Percent by Weight |
| citric acid | 26.2 |
| malic acid | 21.1 |
| low-foaming non-ionic or anionic detergent | 0.3 |
| sodium carbonate | 43.0 |
| sodium hydroxide | 9.4 |

EXAMPLE 7

| pH 12 | |
|---|---|
| Ingredient | Percent by Weight |
| citric acid | 23.4 |
| malic acid | 18.8 |
| low-foaming non-ionic or anionic detergent | 0.3 |
| sodium carbonate | 38.3 |
| sodium hydroxide | 19.2 |

To use the composition of the invention to clean a metal surface, a corrosion inhibitor is added to the basic formula. The corrosion inhibitors are added to the formulations of Examples 3, 4, and 5. This permits the cleaning formulations to be used to remove alkaline scale from metal surfaces, in particular high iron and aluminum alloys which normally corrode when exposed to acid pH.

| Typical Corrosion Inhibitors | | |
|---|---|---|
| Ingredient | Final Concentration | Reference |
| a. diethyl thiourea | 1 g/l. | |
| b. N,N'—dicyclohexyl-thiourea and | 0.25 g/l. | USP 3,979,311 |
| ethynylcyclohexanol | 0.25 g/l. | |
| c. furfural and | 12 g/l. | USP 3,969,255 & |
| dialkylthiourea | 6 g/l. | USP 4,025,359 |
| d. sulfonium compounds | 2–4 mMole/l. | USP 3,969,414 & USP 4,101,438 |
| e. phytic acid | 1 g/l. | |

EXAMPLE 8

| pH 1.8 | |
|---|---|
| Ingredient | Weight |
| citric acid | 12.2 grams |
| malic acid | 9.8 grams |
| low-foaming non-ionic or anionic detergent | 0.15 grams |
| phosphoric acid | 55 grams |
| diethylthiourea | 4 grams |

The ingredients are dissolved in 4 liters of water, and the solution is applied to the surface to be cleaned in the usual manner for a sufficient period of time to remove the scale.

EXAMPLE 9

| pH 1.8 | |
|---|---|
| Ingredient | Weight |
| citric acid | 12.2 grams |
| malic acid | 9.8 grams |
| low-foaming non-ionic or anionic detergent | 0.15 grams |
| phosphoric acid | 15.6 grams |
| N,N'—dicyclohexylthiourea | 1 gram |
| ethynylcyclohexanol | 1 gram |

EXAMPLE 10

| pH 4.0 | |
|---|---|
| Ingredient | Weight |
| citric acid | 12.2 grams |
| malic acid | 9.8 grams |
| low-foaming non-ionic or anionic detergent | 0.15 grams |
| monobasic sodium phosphate | 15.6 grams |
| dibasic sodium phosphate | 2.1 grams |
| furfural | 24 grams |
| dialkylthiourea | 12 grams |

Thus, it will be appreciated that the objects set forth at the outset have been accomplished by reference to the presently preferred embodiments. It will be understood that the invention may be otherwise variously practiced within the scope of the following claims.

What is claimed is:

1. A composition for cleaning solid surfaces in reverse osmosis water purification systems which are fouled with inorganic scale, comprising a 0.1 to 5 percent by weight water solution of a composition consisting essentially of (a) at least one of a monobasic alkali metal or ammonium phosphate; (b) at least one of a dibasic alkali metal or ammonium phosphate; (c) an effective amount of at least one of citric acid, malic acid, or sulfamic acid; and (d) an effective amount of a low-foaming nonionic detergent, and having a pH of from 2 to 4.

2. A composition as claimed in claim 1, wherein said last mentioned composition comprises, in percent by weight:

| | |
|---|---|
| monobasic sodium, potassium or ammonium phosphate | 10–40% |
| dibasic sodium, potassium or ammonium phosphate | 10–40% |
| citric acid | 0–60% |
| malic acid | 0–60% |
| a low foaming nonionic detergent | 0.1–5% | provided that at least one of said citric and malic acids must be present, the combined amount of said acids being at least 20%.

3. A composition as claimed in claim 2, wherein said detergent is polyoxyethylene (12) tridecyl ether.

4. A composition as claimed in claim 3, wherein said last mentioned composition comprises, in percent by weight:

| | |
|---|---|
| monobasic sodium, potassium or ammonium phosphate | 29.0% |
| dibasic sodium, potassium or ammonium phosphate | 15.2% |
| citric acid | 30.5% |
| malic acid | 24.5% |
| polyoxyethylene (12) tridecyl ether | 0.8% |

5. A composition as claimed in claim 2, which is effective for dissolving iron scale, wherein said last mentioned composition further comprises from 5 to 30 percent by weight oxalic acid.

6. A composition as claimed in claim 5, wherein said last mentioned composition comprises, in percent by weight:

| | |
|---|---|
| monobasic sodium, potassium or ammonium phosphate | 19.9% |
| dibasic sodium, potassium or ammonium phosphate | 21.0% |
| citric acid | 25.5% |
| malic acid | 21.3% |
| oxalic acid | 11.7% |

-continued

| | |
|---|---|
| polyoxyethylene (12) tridecyl ether | 0.7%. |

7. A composition as claimed in claim 1, 2, 3, 4, 5, or 6, wherein the concentration is about 2 percent and the pH is from 2 to 3.

8. A composition for cleaning solid surfaces in reverse osmosis water purifications systems which are fouled with inorganic scale comprising, in percent by weight:

| | |
|---|---|
| monobasic sodium, potassium or ammonium phosphate | 29.0% |
| dibasic sodium, potassium or ammonium phosphate | 15.2% |
| citric acid | 30.5% |
| malic acid | 24.5% |
| polyoxyethylene (12) tridecyl ether | 0.8% |

9. A composition for cleaning solid surfaces in reverse osmosis water purification systems which are fouled with inorganic scale comprising in percent by weight:

| | |
|---|---|
| monobasic sodium, potassium or ammonium phosphate | 19.9% |
| dibasic sodium, potassium or ammonium phosphate | 21.0% |
| citric acid | 25.5% |
| malic acid | 21.3% |
| oxalic acid | 11.7% |
| polyoxyethylene (12) tridecyl ether | 0.7% |

* * * * *